United States Patent [19]

Mastronardo et al.

[11] Patent Number: 4,790,926

[45] Date of Patent: * Dec. 13, 1988

[54] DUAL AND SINGLE AUDIO DISC BOX STORAGE TRAY

[75] Inventors: Patrick Mastronardo, 3151 Highbridge Rd., Stamford, Conn. 06903; Fu-Jung Liu, Taipei, Taiwan

[73] Assignee: Patrick Mastronardo, Stamford, Conn.

[*] Notice: The portion of the term of this patent subsequent to May 3, 2005 has been disclaimed.

[21] Appl. No.: 61,583

[22] Filed: Jun. 15, 1987

Related U.S. Application Data

[63] Continuation-in-part of Ser. No. 887,839, Jul. 21, 1986, Pat. No. 4,741,438.

[51] Int. Cl.[4] .......................................... B65D 65/672
[52] U.S. Cl. .................................... 206/309; 206/387; 220/21; 211/40
[58] Field of Search ................. 206/387, 309; 220/21; 211/40

[56] References Cited

U.S. PATENT DOCUMENTS

| | | | |
|---|---|---|---|
| 3,756,383 | 9/1973 | Krytzer | 206/387 |
| 3,856,369 | 12/1974 | Commiant | 206/387 |
| 4,231,473 | 11/1980 | Aprahmian | 206/387 |
| 4,235,490 | 11/1980 | Schwartz et al. | 206/387 |
| 4,432,453 | 2/1984 | Berkman | 206/387 |
| 4,577,914 | 3/1986 | Stravitz | 206/387 |

Primary Examiner—Joseph Man-Fu Moy
Attorney, Agent, or Firm—Marvin Feldman

[57] ABSTRACT

A storage tray has opposed first sets of spaced ribs forming parallel compartments and a second set of shorter ribs transversely disposed between the first sets of ribs with the spacing being one first rib and one adjacent second rib being sized to slidably receive one single compact audio disc box, so that two single compact audio disc boxes fit every compartment. The shorter ribs are formed with guide flanges. Two adjacent single boxes may be removed, and then one dual audio disc box is received in the compartment between adjacent first ribs, and with the second rib being slidably and guidingly received in the back recess of a conventional dual audio disc box. The storage tray is self-interlocking with another storage tray so as to form a self-contructing cabinet.

13 Claims, 3 Drawing Sheets

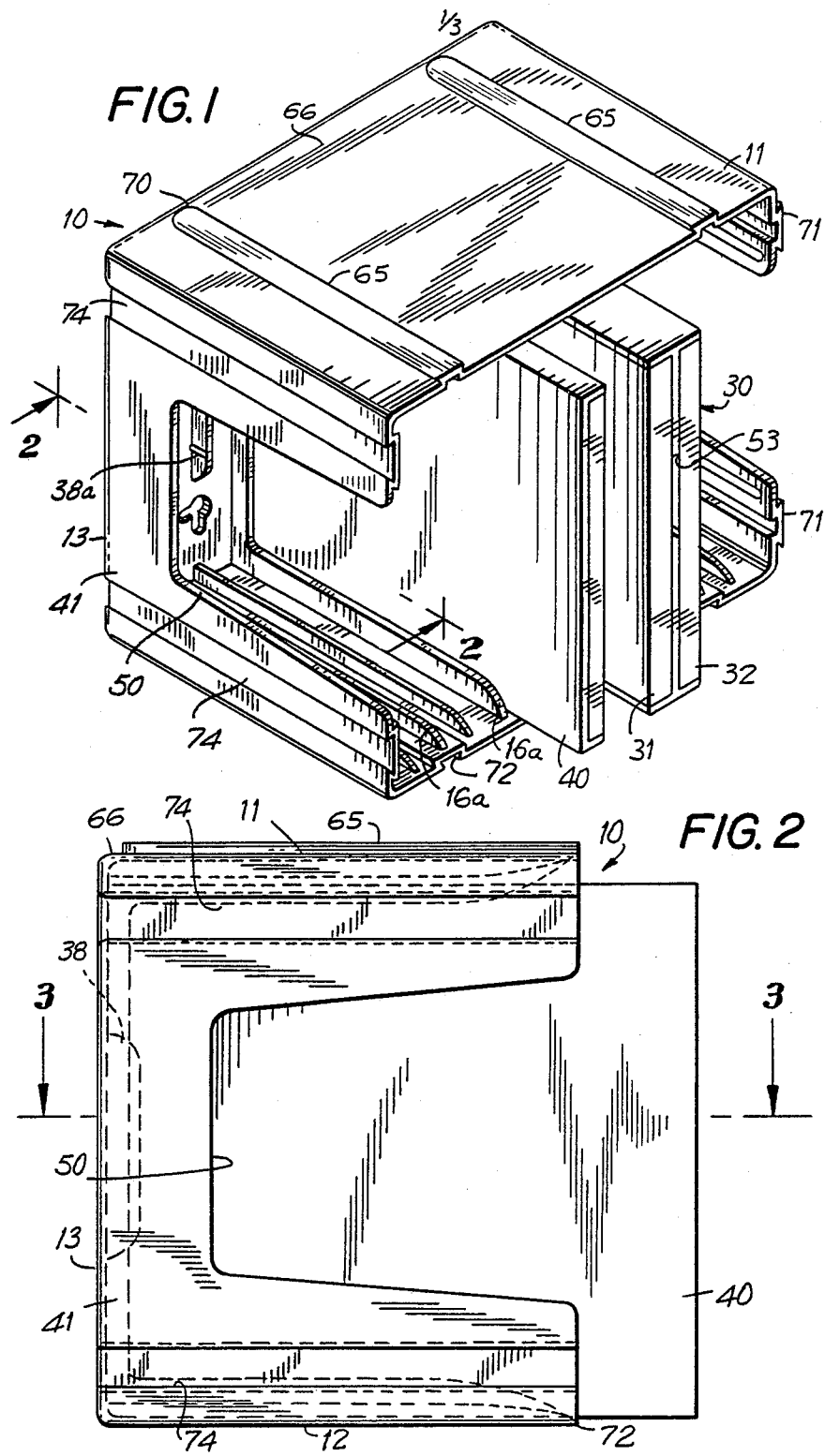

DUAL AND SINGLE AUDIO DISC BOX STORAGE TRAY

RELATED U.S. APPLICATIONS

This application is a continuation-in-part of U.S. Ser. No. 887,839 filed July 21, 1986, now U.S. Pat. No. 4,741,438.

FIELD OF THE INVENTION

This invention relates to a storage tray for compact audio discs.

BACKGROUND AND DISCUSSION OF THE PRIOR ART

With the invention of compact audio discs, the protection and storage of these discs presented a problem for manufacturers as well as consumers. At first a single compact audio disc was packaged in a rectilinear clear plastic box. One prior art construction to store these single discs was a try with upper and lower opposed spaced a parallel elongated ribs, with the spacing between the ribs being sized to slidably receive one single disc box.

Long-playing works as well as multiple related works had to be recorded on two discs which gave rise to the dual disc plastic box. This plastic box folded open in a box-like manner in two opposed sections, with one disc being housed in each section.

The art then desired a storage tray which would readily accept both the single compact disc boxes as well as the dual compact disc boxes, so that a consumer in purchasing a disc storage tray would be assured that the tray would accommodate both single and dual boxes in a reasonable and positive storage mode.

SUMMARY OF THE INVENTION

A storage tray is formed with the elongated parallel first ribs which first ribs are spaced at distances approximately equal to the thickness of a dual compact audio disc box so as to form a compartment for the dual box, and one each of a second set of ribs having guide flanges is transversely disposed between a pair of adjacent first ribs, with the space between one first rib and one second rib being approximately equal to the thickness of a single audio disc box, and with the second rib sized to slidably and guidingly fit into the back recess of the spine of the conventional dual audio disc box, so that each compartment receives either one dual audio disc box or two single audio disc boxes. The second ribs are transversely disposed on the back wall of the tray and at an angle of 90° from the first ribs. Each second rib is formed with outwardly extending guide flanges so that the dual box guidingly engages the second rib.

Third ribs are disposed between the first ribs to guide the single boxes into place, and the third ribs are sized so that dual box fits between upper and lower third ribs and rests on the lower third rib.

The tray is self-interlocking with other trays so as to form a cabinet.

BRIEF DESCRIPTION OF THE DRAWINGS

FIG. 1 is a perspective view of the storage tray of the present invention;

FIG. 2 is an enlarge side elevational view of the storage tray taken along line 2—2 of FIG. 1;

DISCUSSION OF THE PREFERRED EMBODIMENTS

Figure 3:
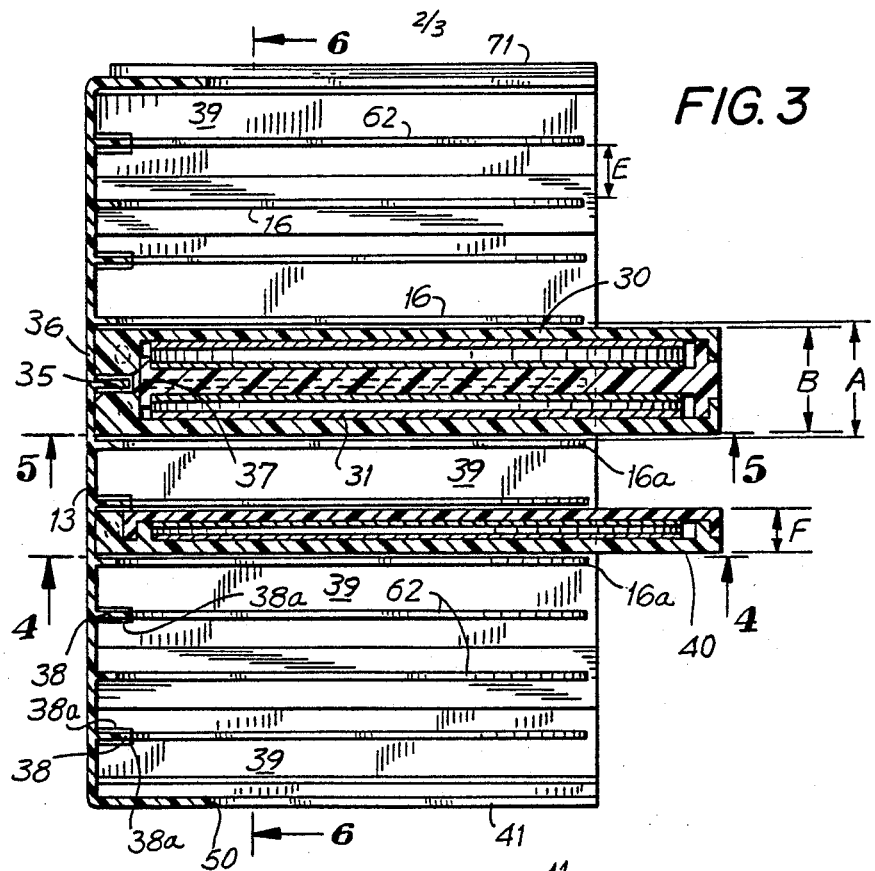
FIG. 3 is a fragmentary sectional view taken along line 3—3 of FIG. 1.
Figure 4:
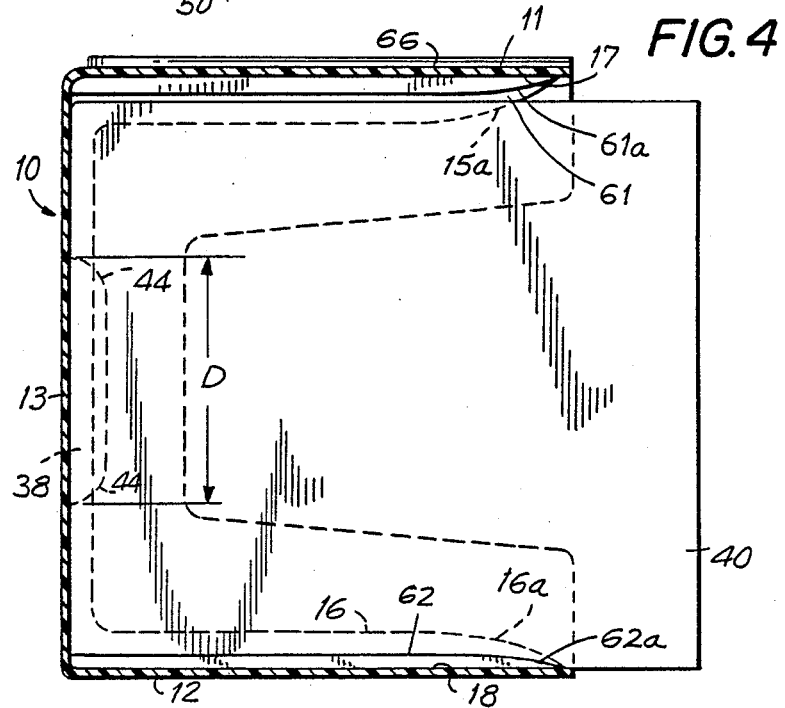
FIG. 4 is a sectional view taken along line 4—4 of FIG. 3.
Figure 5:
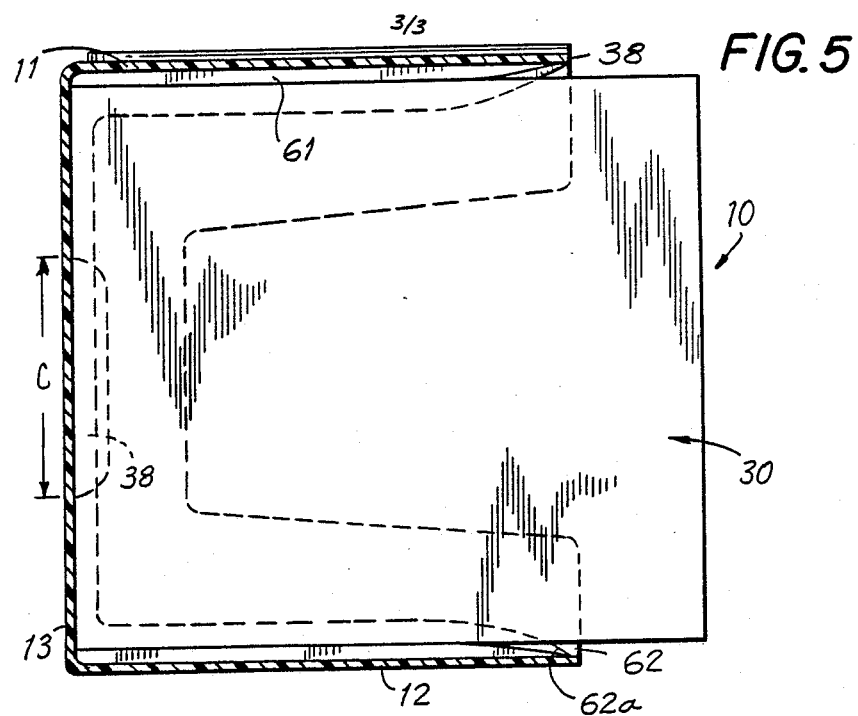
FIG. 5 is a sectional view taken along line 5—5 of FIG. 3.
Figure 6:
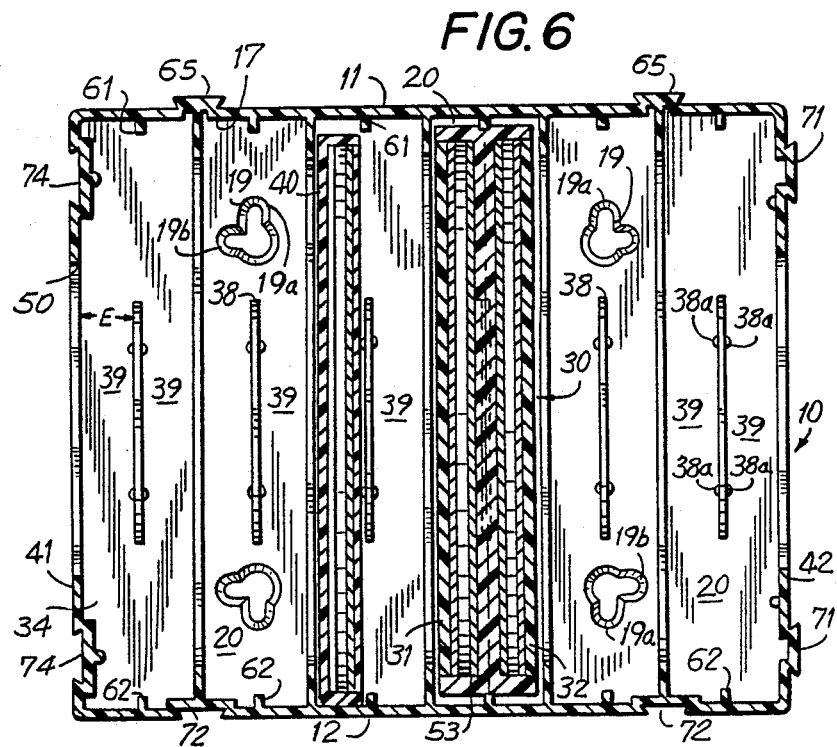
FIG. 6 is a sectional view taken along line 6—6 of FIG. 3.

Referring to the FIGS., there is shown the storage tray of the present invention generally referred to by reference numeral 10. Tray 10 is of unitary injection molded construction and has a top wall 11, a bottom wall 12, and a rear or back wall 13, so as to form a U-shaped structure 50, with bottom wall 12, resting on a flat horizontal surface (not shown). End walls 41 and 42 partially enclose the tray 10 in structure 50. Back wall 13 may also be mounted through mounting hole 19 to a flat vertical surface (not shown). Mounting hole 19 is formed with lobes 19a and 19b for alternate horizontal or vertical disposition mounting of tray 10.

A plurality of elongated spaced parallel ribs 15 and 16 are formed in the top and bottom walls 11 and 12, respectively. Ribs 15 and 16 are formed in opposing top and bottom wall surfaces 17 and 18, respectively, so as to provide a series of compartments 20 disposed between adjacent ribs 15, or 16, or 15 and 16. Ribs 15 and 16 are formed with curved tapered forward ends 15a and 16a. The distance A between adjacent ribs 15, and similarly between adjacent ribs 16, is approximately equal to thickness B of dual compact audio disc box 30. Box 30 is of conventional construction and contains two standard compact audio discs, with each disc being stored on separate sides 31 and 32, with back spine midline 33 and front midline 53, so that sides 31 and 32 part in a hook-line manner on opposite sides on midline 53 for access to the individual discs.

The conventional dual box 30 is provided with a vertical slot 35 formed in the spine 36. Slot 35 is disposed in the middle of spine 36 and is of the entire length C.

Back wall 13 of tray 10 is formed with a series of spaced parallel ribs 38 which are shorter than sides 15 and 16, and have a length D, which is shorter than the length C of slot 35. Ribs 38 are centrally disposed on the inside surface 34 of wall 13. It is important to note that while ribs 38 are transversely disposed at 90° from ribs 15 and 16, ribs 13 bisect distance A so as to form dual or twin compartments 39, with a distance E between rib 38 and rib 15 or rib 16, which distance E is about equal to the thickness F of a conventional single audio disc box 40. Ribs 38 are formed with rounded inner edges 44 for ready insertion in slot 35.

Importantly, ribs 38 are formed with outwardly extending flanges 38a for guiding dual box 30 into place. This, the flanges 38a engage walls of 30 which form slot 35.

Third sets of ribs 61 and 62 are formed in and extend from top and bottom walls 17 and 18, respectively. Ribs 61 and 62 are parallel to ribs 15 and 16, respectively, and are of substantially lesser height than ribs 15 and 16. Ribs 61 and 62 are coplanar with ribs 38, but disposed at 90° thereto. Ribs 61 and 62 are formed with respective forward tapered curved edges 61a 61a and 62a for guiding a dual box 30 into place.

By the aforesaid manner of construction, single disc box 40 is slidably received in compartment 39 between one rib 38, ribs 62 and 62, and ribs 15 and 16. Two single disc boxes 40 fit within one compartment 20. With the removal of the two single disc boxes 40, one dual disc box 30 may then be slidably received in compartment 20 between adjacent ribs 15 at the top and between adjacent ribs 16 at the bottom. Box 30 is contactingly disposed between ribs 61 and 62, and mounts the top of lower rib 62. With full insertion of box 30, rib 38 and particularly guide flanges 38a are slidably received in slot 35 to securely mount box 30U, with box spine 36 abutting back wall 13.

Another important aspect of the present invention is the self-interlocking construction. A series of three elongated flanges 65 are formed on the top surface of 66 of top wall 11. Flanges 65 are formed with chamfered edge 67 extending from front edge 68 to rear portion 69, at which point flange 65 is formed with rearward curved portion 70. A series of two parallel elongated flanges 71, similarly constructed to flanges 65, are formed on end wall 41. A series of three elongated grooves 72 are formed on the bottom surface 73 of bottom wall 12. Grooves 72 are spaced and sized to sidably receive flanges 65 of a second tray (not shown) so as to provide two trays in a self-interlocking vertical stacked mode. End wall 42 is formed with two parallel elongated grooves 74, which are similar to grooves 72 and are spaced and sized to slidably receive flanges 71 of a second tray not shown so as to provide two trays in a self-interlocking side-by-side mode. In the aforesaid manner, a plurality of trays 10 may be self-interlocked to form a free standing cabinet or structure.

There has been shown a storage tray which can readily store both single audio disc boxes as well as dual audio disc boxes in a secure and convenient manner.

Various modifications are with the contemplation of the invention including the mounting of the storage tray 10 in a carrying case construction for portable use.

It is also within the contemplation of the invention to mount the U-shaped tray in an upright manner so that in effect the back wall rests on a flat horizontal surface.

What is claimed is:

1. A storage tray for audio disc boxes comprising: opposed top an bottom walls, and a back wall interconnecting said top and bottom walls, a plurality of elongated first ribs disposed on at least one of the top and bottom walls, with the spacing between first ribs being about equal to the thickness of a conventional dual audio disc box, and a plurality of second ribs, and one of said second ribs being disposed between adjacent first ribs with the distance between a first rib and an adjacent second rib being about equal to the thickness of a conventional single audio disc box, and wherein the length of the second rib being sized to slidably fit a back recess formed in the conventional dual audio disc box, said record rib comprising guide means for engaging within the recess, whereby one dual audio disc box is store in the compartment between first ribs with the second rib and guide means fitting into the back recess, or two single aduio disc boxes are stored in the compartment with each single disc box disposed between a first rib and a second rib.

2. The storage tray of claim 1, wherein the second ribs are disposed 90° from the first ribs.

3. The storage tray of claim 2, said guide means comprising outwardly extending flanges.

4. The storage tray of claim 2, further comprising first ribs facingly disposed on the top wall and bottom wall.

5. The storage tray of claim 4, said second ribs are disposed on said back wall.

6. The storage tray of claim 5, said second ribs are shorter than first ribs.

7. The storage tray of claim 6, said second ribs centrally disposed between said top wall and bottom wall.

8. The storage tray of claim 7, further comprising end walls between said top wall and bottom wall, and in parallel disposition to said first ribs.

9. The storage tray of claim 8, said end walls formed a portion contiguous to said back wall.

10. The storage tray of claim 9, said tray comprising a unitary molded plastic piece.

11. The storage tray of claim 1, said first ribs comprising rounded edges tapered forward.

12. The storage tray of claim 1, further comprising third ribs being disposed between said first rib said third ribs being of lesser height than said first ribs, and being coplanar with said second ribs, said third ribs comprising rounded tapered forward edges.

13. The storage tray of claim 1, further comprising means to mount the tray to a vertical wall in two positions disposed at 90° from each other.

* * * * *